United States Patent [19]

Brake et al.

[11] 4,235,267

[45] Nov. 25, 1980

[54] VALVED COUPLINGS

[75] Inventors: Arthur L. Brake, Winscombe; David A. C. Harper, Almondsbury, both of England

[73] Assignee: Bristol Aerojet Limited, Avon, England

[21] Appl. No.: 963,789

[22] Filed: Nov. 27, 1978

[30] Foreign Application Priority Data

Nov. 25, 1977 [GB] United Kingdom ............... 49261/77

[51] Int. Cl.[3] ............................................. B65B 3/04
[52] U.S. Cl. ................................... 141/293; 141/347
[58] Field of Search ................................ 141/346–352, 141/382–386, 291–296

[56] References Cited

U.S. PATENT DOCUMENTS 2,948,307  8/1960  Rittenhouse et al. ................. 141/348

FOREIGN PATENT DOCUMENTS 1212777 11/1970 United Kingdom .
1264890 2/1972 United Kingdom .
1280111 7/1972 United Kingdom .
1339034 11/1973 United Kingdom .
1392997 5/1975 United Kingdom .
1441242 6/1976 United Kingdom .
1448910 9/1976 United Kingdom .

Primary Examiner—Frederick R. Schmidt
Attorney, Agent, or Firm—Oblon, Fisher, Spivak, McClelland & Maier

[57] ABSTRACT

A valved coupling for high pressure fluids, particularly for use with pressure vessels containing gases at pressures above 200 kilograms per square centimeter, the coupling providing a first flow path containing a first valve and a second flow path extending from a point in the first flow path downstream of the first valve to a venting passage and a second valve in the second path, the coupling comprising a bore, a valve operating member which is axially movable in the bore, a valve member which is concentric with the valve operating member and is axially movable relative to the bore and the valve operating member, a first axially facing valve seat on the valve operating member, a second valve seat on the valve member facing in the opposite direction to the first valve seat, and stop means engaged by the valve member not earlier than the closure of the first valve in movement of the valve member in a direction to close the first valve whereby after the first path is closed the second path is opened to vent fluid from the coupling, the second path being closed before the first valve is opened again.

11 Claims, 17 Drawing Figures

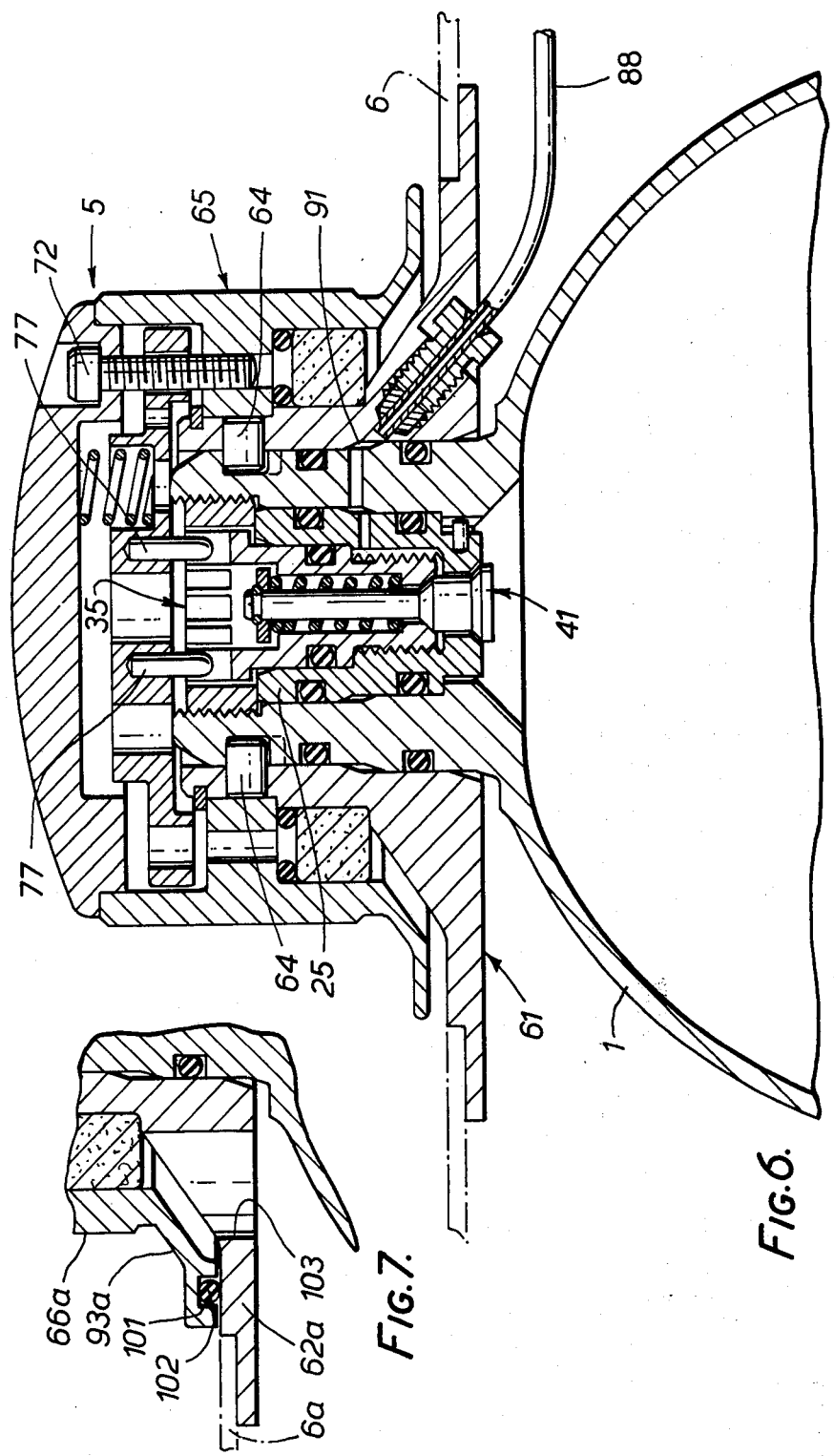

VALVED COUPLINGS

BACKGROUND OF THE INVENTION

(1) Field of the Invention

This invention relates to valved couplings for high pressure fluids and is particularly, but not exclusively, useful for controlling the discharge of fluid from pressure vessels containing compressed gas at pressures above 200 kilograms per square centimeter.

(2) Prior Art

A number of valved couplings have been proposed for high pressure hydraulic lines and for pneumatic lines. Thus, British Patent Specification No. 1 339 034 discloses a coupling for a hydraulic line in which valves close off flow upon disconnection of the couplings and the valves also may be closed by cam operation. The specification describes a coupling having a cam which rotates about an axis perpendicular to the flow axis of the coupling, the cam having two diametrically opposite recesses one of which controls a ball valve in the flow passage through the coupling and the other of which controls a sleeve which slides in the bore of the coupling and contains a radial passage which can be aligned with a radial passage through the body of the coupling to relieve pressure downstream of the ball valve when the ball valve is closed. In this arrangement the ball valve and the bleed valve are operated by different parts of a single cam but are otherwise independent of one another. In order to prevent leakage when the radial passages are not aligned with one another, it is necessary to provide O-rings in the wall of the bore on each side of the radial passage in the body and such sealing arrangements are quite unsuitable when they are to have a port moving past them and when they are required to operate at very high pressures. The port formed by the outer end of the radial passage in the sleeve will tend to damage one of the O-rings as it passes the O-ring if the O-ring is to be suitable for high pressures. Also, the O-ring will exert considerable frictional resistance on the movement of the sleeve so that it is possible for the sleeve to jam and for no bleeding to occur.

Another type of coupling incorporating means for bleeding the interior of the coupling when the valve in the coupling is closed is described in British Patent Specification Nos. 1 264 890 and 1 212 777. In this type the coupling includes a rotary ball which acts in the manner of a plug valve and revolves within the seats which engage the circumferential surface of the ball. It will be apparent that such radially engaging surfaces cannot provide sealing against high pressures and are quite unsuitable for pressures of the order of 200 kilograms per square centimeter. A further disadvantage of the construction described in these arrangements is that the bleed passage is opened before the main passage is wholly closed so that there will be a considerable loss of fluid each time the valve is operated.

SUMMARY OF THE INVENTION

According to the present invention, a valved coupling for high pressure fluids comprises first and second elements with means for releasably connecting the elements together to provide a first flow path for fluid through the elements; a first valve in the first element controlling flow through the first path; a second path extending from a point in the first path downstream of the first valve to a venting passage; a second valve for controlling flow through the second path; and valve operating means arranged to control the first and second valves in the sequence: close second valve, open first valve, close first valve, open second valve; the coupling comprising a bore, a valve operating member which is axially movable in the bore under the control of the valve operating means in one direction to open and in the other direction to close the first valve, a valve member which is concentric with the valve operating member and is axially movable relative to the bore and the valve operating member, a first valve seat on the valve operating member facing generally in the said one direction, a second valve seat on the valve member facing in the said opposite direction and cooperating with the first valve seat to afford the second valve, and a stop means engaged by the valve member not earlier than closure of the first valve in movement of the valve member in the said opposite direction.

In a valved coupling according to the present invention, the valve controlling flow through the second path to the venting passage has valve seats which are generally axially facing, for example complementary conical surfaces, so that good sealing can be achieved.

The valve operating member may be mounted to another element by a screw-thread arranged so that relative rotation between the valve operating member and the said other element produces axial movement of the valve operating member. In one possible arrangement the said other element is fixed in the bore and the valve operating member is coupled to the valve operating means by a coupling transmitting rotation without translation. With this arrangement the second valve may be located in the first element and formed by a third annular valve seat on the valve member facing generally in the said opposite direction and a fourth annular valve seat on the other element, the third and fourth seats constituting the said stop means.

BRIEF DESCRIPTION OF THE DRAWINGS

FIG. 6 is a view similar to FIG. 5 with the pressure vessel entered into the mounting and with the discharge valve in the pressure vessel opened;

FIG. 7 is a detail similar to part of FIG. 5 showing a construction providing an alternative route for vented gas;

DETAILED DESCRIPTION

Figure 1:
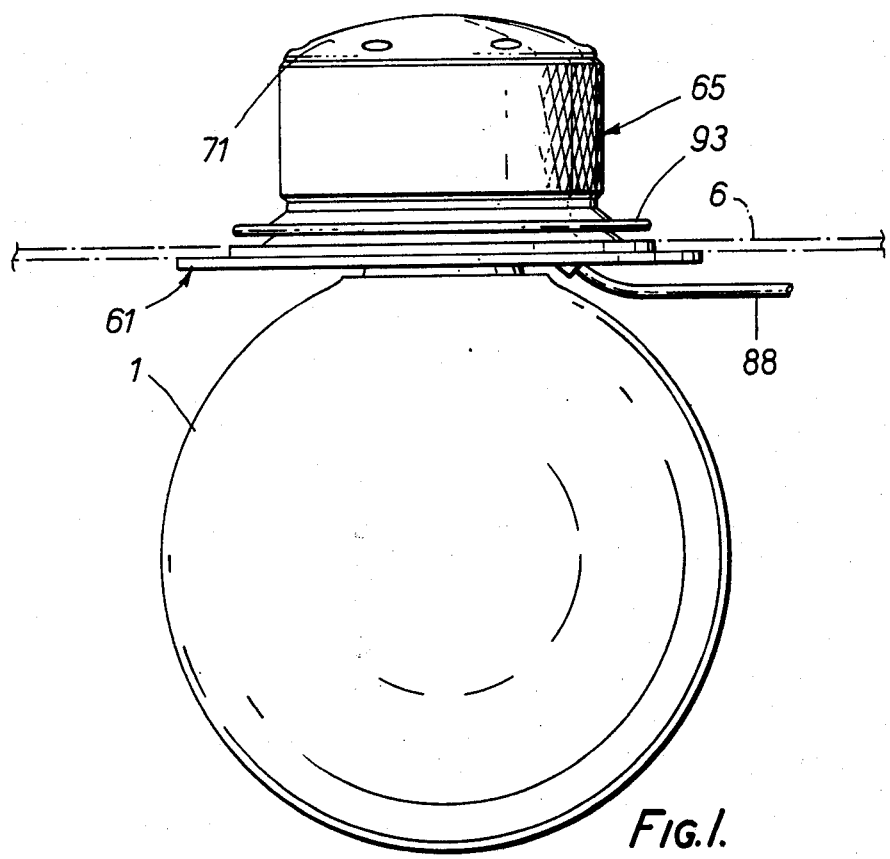
FIG. 1 is a side elevation of a pressure vessel received in and mounted on a mounting.
Figure 2:
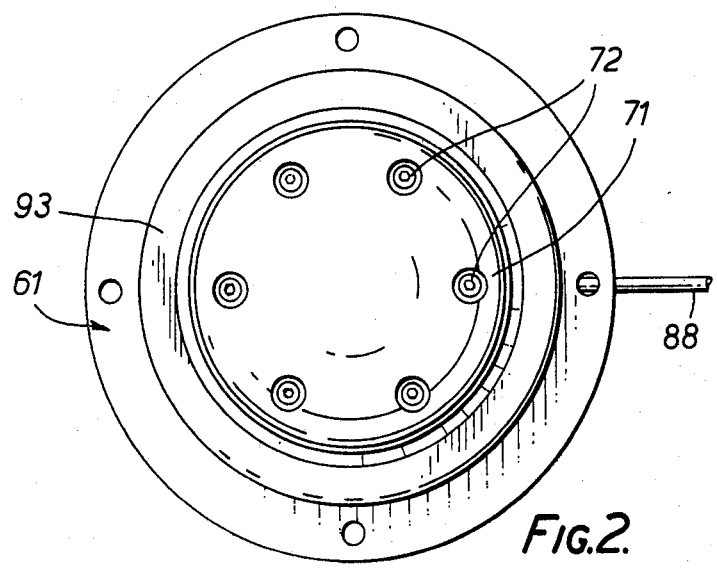
FIG. 2 is an end elevation of the mounting shown in FIG. 1.
Figure 3:
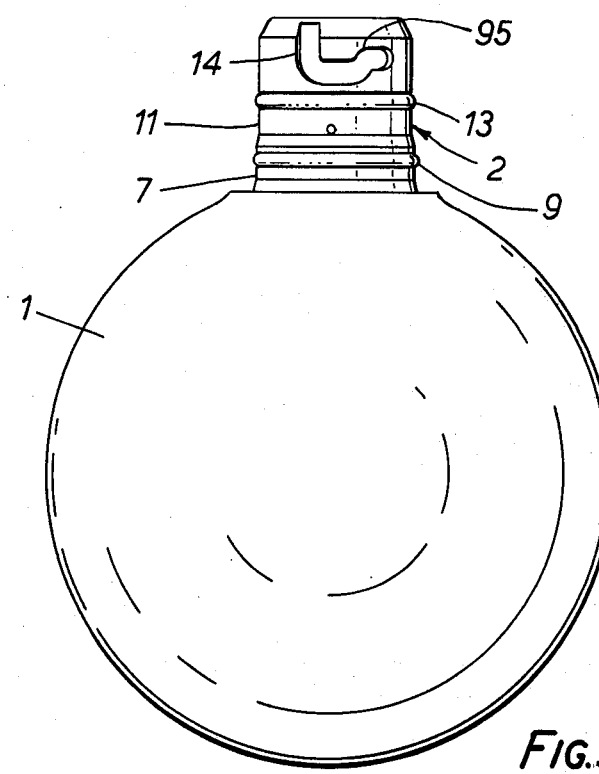
FIG. 3 is a side elevation similar to FIG. 1 of the pressure vessel alone.
Figure 4:
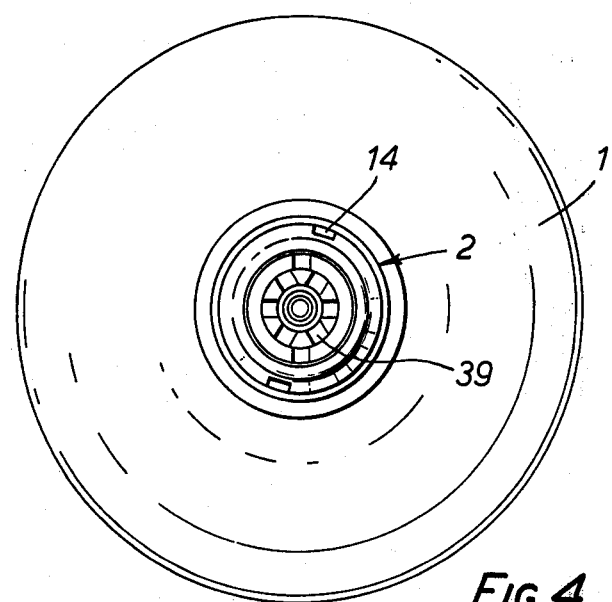
FIG. 4 is an end elevation similar to FIG. 2 of the pressure vessel alone.
Figure 5:
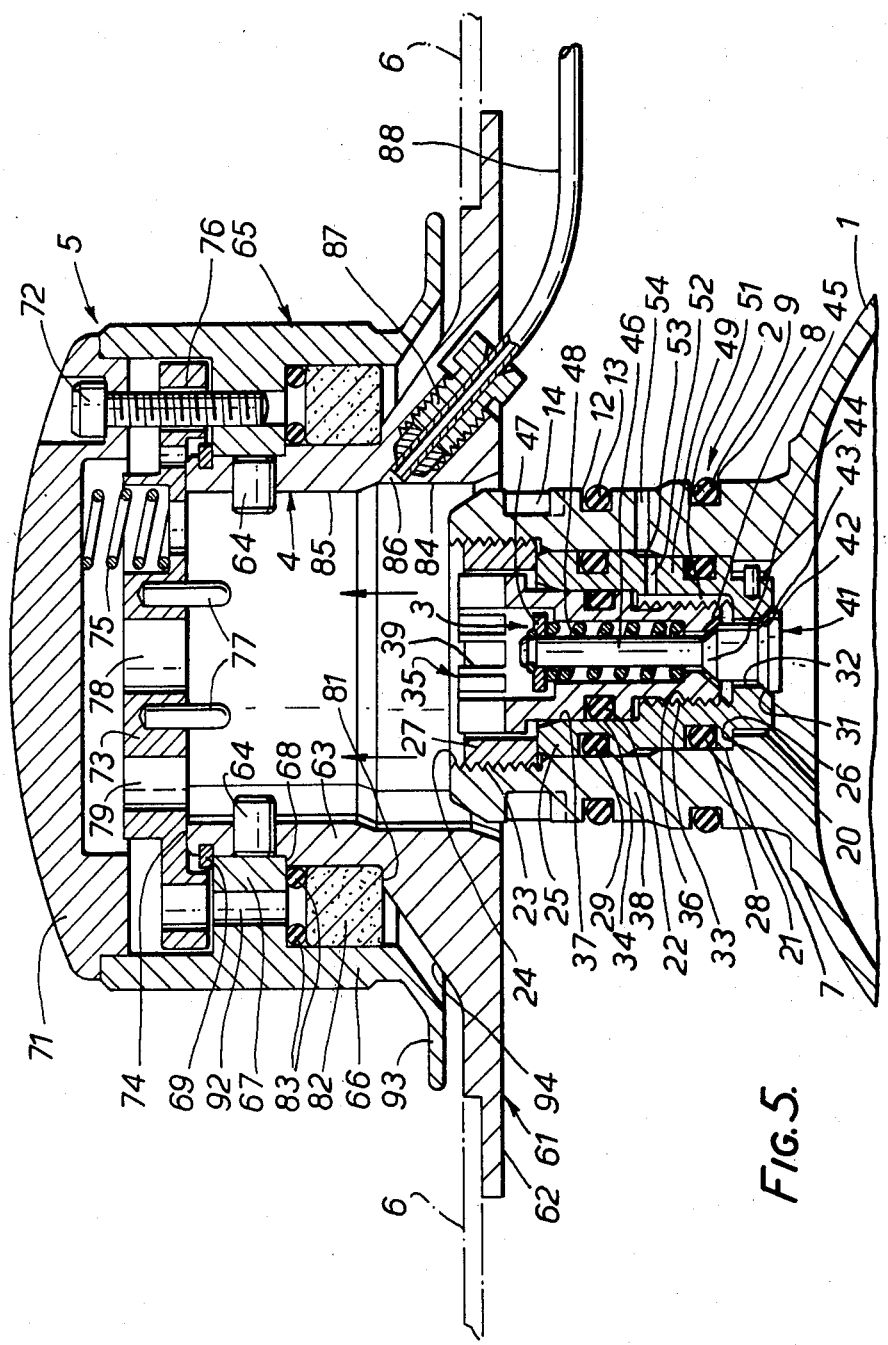
FIG. 5 is an axial section to a larger scale of the pressure vessel and mounting with the pressure vessel in a position in which it is ready to be offered up to the mounting.

FIGS. 1 to 6 and particularly FIGS. 5 and 6 show a spherical pressure vessel or bottle 1 intended to carry gas at a pressure of approximately 560 kilograms per square centimeter when fully charged and having a neck 2 containing a valve system 3 and enterable into a socket 4 of a mounting and valve operating assembly 5 carried on a bracket or wall 6.

The outer surface of the neck 2 has a first cylindrical surface 7 formed with a groove 8 containing an O-ring 9 and a second cylindrical surface 11 of smaller diameter than the first cylindrical surface 7 and also containing a groove 12 containing an O-ring 13. The smaller cylindrical surface 11 is formed with two generally L-shaped grooves 14 which form one half of a bayonet coupling.

The interior surface of the neck is formed with a shoulder 20, a first cylindrical surface 21, a second cylindrical surface 22 of larger diameter than the first cylindrical surface, and a third cylindrical surface 23 which is of greater diameter than the second cylindrical surface 22 and is formed with a female screw-thread 24. Fitted within the neck is a generally cylindrical seat member 25 having a shoulder 26 which abuts the shoulder 20 on the neck and which is held in position by a ring nut 27 having a male thread meashing with the thread 24 on the neck. The seat member has cylindrical surfaces corresponding to the first and second inner cylindrical surfaces 21 and 22 of the neck and formed with grooves containing O-rings 28 and 29.

The inner circumferential surface of the seat member 25 is formed at its inner end with a conical valve seat 31 followed by a neck portion 32. This in turn is followed by a first cylindrical surface 33 formed with a female screw-thread and a second cylindrical surface 34.

Fitting within the seat member 25 is a generally cylindrical valve operating member 35 whose external surface comprises a first cylindrical portion 36 formed with a male screw-thread cooperating with the female screw-thread on the surface 33 of the seat member, and a second cylindrical surface 37 slidable within the second cylindrical surface 34 of the seat member and provided with a groove containing an O-ring 38. The upper end of the valve operating member is formed with castellations 39.

Axially movable within the valve operating member 35 and the valve seat member 25 is a valve member 41 having at its inner end a valve disc 42 formed with a first conical surface 43 cooperating with the valve seat 31 and a second conical surface 44 cooperating with a conical valve seat 45 at the inner end of the valve operating member 35. The valve member 41 also includes a stem portion 46 carrying at the outer end a collar 47. A compression spring 48 between the collar 47 and a shoulder 49 on the valve operating member 35 biases the valve member 41 in a direction such that the conical surface 43 engages the seat 45.

The seat member 25 is formed with a longitudinal groove 51 and a radial passage 52 which leads to an annular space 53 between the neck and the valve seat member. The neck has a radial bore 54 leading from this annular space 53 to the outside of the neck.

The mounting and valve operating assembly 5 comprises a stationary member 61 comprising an annular flange portion 62 which is bolted to the mounting wall 6, and a hollow boss portion 63 carrying pins 64 which cooperate with the grooves 14 in the neck of the pressure vessel and form the other half of the bayonet coupling. A rotatable knob 65 is mounted on the boss portion 63 and comprises a generally cylindrical element 66 having an inwardly directed circumferential flange 67 which is retained between a shoulder 68 on the boss portion 63 and a circlip 69. The knob also comprises a generally disc-shaped cover 71 which is connected to the cylindrical element 66 by screws 72.

Within the knob 65 is a disc 73 which is axially movable within the knob within limits determined by the cover 71 and the outer edge 74 of the boss portion 63, the disc being biased towards the boss portion by a plurality of compression springs 75. The disc 73 is held against rotation relative to the knob by the screws 72 which pass through apertures 76 in the disc. The disc carries a number of pins 77 and is formed with a central aperture 78 and a further ring of apertures 79.

Positioned between the flange 67 and a shoulder 81 on the boss portion 63 is a silencer 82 formed by an annular sintered body which is sealed against the flange 67 by O-rings 83.

The inner surface of the boss portion 63 has a first cylindrical portion 84 within which the first cylindrical surface 7 on the neck of the pressure vessel is a close fit, and a second cylindrical portion 85 of smaller diameter and within which the second cylindrical surface 11 on the neck of the pressure vessel is a close fit. Leading from the first portion 84 is a passage 86 containing a non-return valve 87 and leading to a tube 88.

The operation of the pressure vessel and the mounting and operating assembly shown in FIGS. 1 to 6 will now be described. As shown in FIG. 5, the valve operating member 35 is in its outer position so that the second conical surface 44 on the valve member 41 is spaced from the valve seat 45 on the valve operating member, and the spring 48 together with the pressure of gas within the pressure vessel presses the first conical surface 43 on the valve member 41 on to the valve seat 31 on the seat member 25, thus retaining pressure in the pressure vessel. When the pressure vessel is to be used, the neck of the pressure vessel is entered into the mounting and operating assembly so that the bayonet pins 64 enter the grooves 14 and the pressure vessel is then rotated until the pins 64 reach the ends of the grooves. As the pressure vessel is entered into the mounting assembly, the pins 77 on the disc 73 may immediately enter notches formed by the castellations 39 in the outer end of the valve operating member 35, but if they do not the springs 75 will become compressed and will cause the pins to enter notches in the castellations as soon as there is relative rotational movement between the valve operating member 35 and the disc 73. Entering the pressure vessel into the mounting assembly in this way establishes a path between the passage 86 and the exterior via an annular space 91 formed between the neck 2 and the boss portion 63, the bore 54, the annular space 53, the passage 52, the groove 51, the gap between the conical surface 44 and the valve seat 45, the interior of the valve operating member 35, the various apertures in the disc 73, a passage 92 through the flange 67, and the silencer 82.

When the contents of the pressure vessel are to be dispensed through the tube 88, the knob 65 is rotated, whereupon the following sequence of events will occur. Firstly, friction in the various parts will tend to rotate the pressure vessel relative to the boss portion 63 to ensure that the pins 64 are at the ends of the grooves 14 in case, due to inadvertence, this has not previously occurred. Thereupon, the dog clutch formed by the pins 77 and the castellations 39 will cause the valve operating member 35 to be rotated, causing it to be moved axially towards the interior of the pressure vessel because of the interaction of the threads on the surface 33 and on the portion 36. After some axial movement, the valve seat 45 will engage the second conical surface 44 of the valve member 41 to close the path referred to above extending from the passage 86 to the exterior. On further axial movement, the first conical surface 43 will move away from the valve seat 31 on the valve seat member 25, thus providing communication between the interior of the pressure vessel and the tube 88 through the groove 51, the passage 52, the space 53, the bore 54, the space 91, the passage 86 and the non-return valve 87; thus the gas is delivered to a point of use.

When the contents of the pressure vessel are substantially exhausted and it is required to remove the pressure vessel, possibly for replacement by a fully-charged vessel, the knob 65 is first rotated in the opposite direction to that previously described and this will result in the following sequence of events. Firstly, the first conical surface 43 of the valve member 41 will engage the seat 31 on the seat member 25 to close the pressure vessel. Then the seat 45 will move away from the second conical surface 44 on the valve member 41 to re-open the path previously described between the passage 86 and the exterior. Consequently, pressure contained within the assembly will slowly be dissipated through the silencer 82, this escaping gas being directed to travel parallel with the mounting wall 6 and thus away from the operator's hand on the knob 65 by a skirt 93 on the cylindrical element 66 of the knob and a cooperating surface 94 on the stationary memory 61. When this gas has been dissipated, the pressure vessel can be rotated to release the bayonet coupling formed by the grooves 14 and the pins 64, and the pressure vessel removed. Because of the differential areas of the portion of the pressure vessel neck bounded by the first cylindrical surface 7 and the second cylindrical surface 11, any pressure within the assembly and particularly in the annular space 91 biases the pressure vessel in a direction away from the mounting assembly. It will be seen from FIG. 3 that the L-shaped grooves 14 are formed with cranks 95 so that in order to rotate the pressure vessel to unlock the bayonet coupling it is necessary to move the pressure vessel further into the mounting. Because of the force resulting from the pressure acting on the differential areas referred to, this cannot be achieved if the pressure within the assembly has not been largely dissipated and it is therefore not possible to remove the pressure vessel while substantial pressure remains.

It will be appreciated that various modifications may be made to the apparatus described. For example, it is not essential to provide the non-return valve 87 within the mounting assembly and such a non-return valve may be provided at the other end of the tube 88 adjacent the point of use or possibly omitted altogether, and in such cases gas within the tube 88 and possibly in the equipment using the gas will have to be dissipated through the silencer 82 before the pressure vessel can be removed.

Further modifications will now be described with reference to FIGS. 7 to 11 in which the same reference numerals are used as in FIGS. 1 to 6 but with the addition of reference letters.

In the modification shown in FIG. 7, the skirt 93a on the cylindrical member 66a of the knob 65a is formed with a groove 101 containing an O-ring 102 which seals with the flange portion 62a of the stationary member 61a and there is a ring of apertures 103 through the stationary member so that venting of gases contained in the mounting assembly is to the same side of the mounting wall 6a as the pressure vessel instead of to the opposite sides as in the construction shown in FIGS. 1 to 6.

Figures 8, 9:
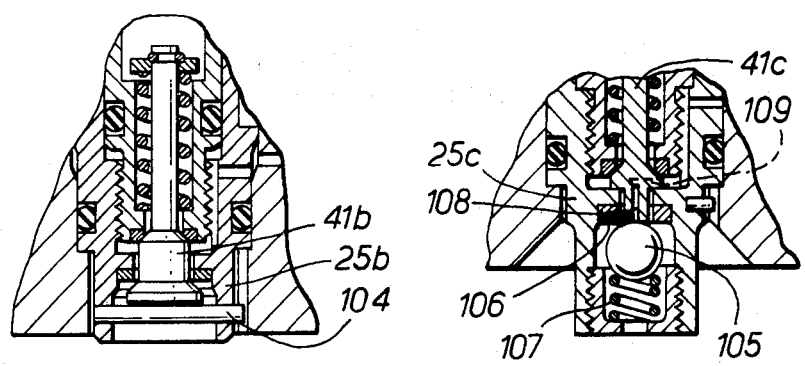
FIG. 8 is a view similar to part of FIG. 6 showing an alternative valve arrangement.
FIG. 9 is a view similar to FIG. 8 showing another alternative valve arrangement.

In the construction shown in FIG. 8, the valve seat member 25b extends inwardly of the pressure vessel beyond the inner end of the valve member 41b and a pin 104 extends diametrically across the extended part beyond the inner end of the valve member 41b so that it will be engaged by the valve member when the knob 65 is rotated to open the valve. The pin 104 provides a positive stop to limit inward movement of the valve member so that as torque continues to be applied to the knob 65 in the valve opening direction the seat 45b on the valve seat member 25b is forced tightly against the conical surface 44 on the valve member in order to effect a reliable seal.

In the construction shown in FIG. 9, the valve formed by the first conical surface 43 on the valve member and the valve seat 31 on the valve seat member 25 are replaced by a ball valve consisting of a ball 105 which is biased against a seat 106 formed in the valve seat member 25c by a spring 107. The valve is opened by the valve member 41c moving the ball 105 against the bias of the spring 107 away from the seat 106 thus opening a passage through a longitudinally extending groove 108 and a radially extending groove 109 formed in the surface of the valve member 41c.

Figure 10:
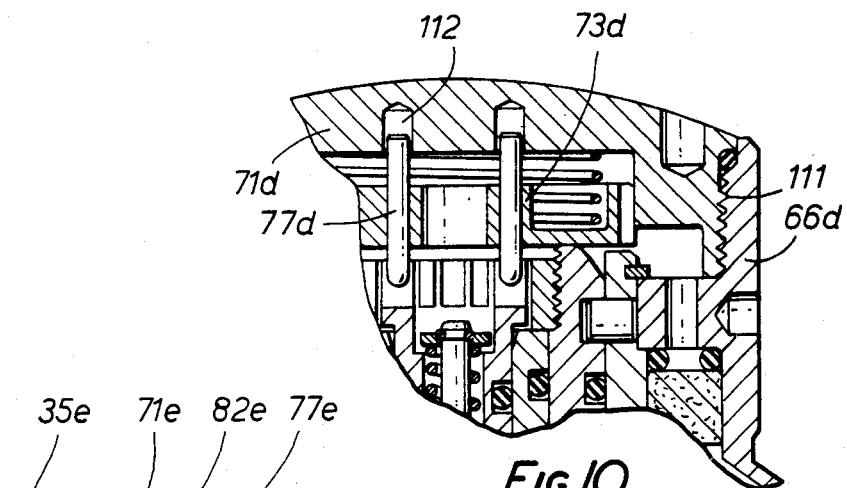
FIG. 10 is a view similar to another part of FIG. 6 showing an alternative clutch and spring assembly.

In the construction shown in FIG. 10 the disc 73d is retained in the cylindrical element 66d of the knob by means of a screw-thread 111 formed on the outer periphery of the disc 73d and engaging with a corresponding screw-thread on the inner circumferential surface of the cylindrical element 66d. The pins 77d project on both sides of the disc 73d and their outer ends extend into apertures 112 in the disc cover 71d to prevent relative rotation between the disc and the knob.

Figure 11:
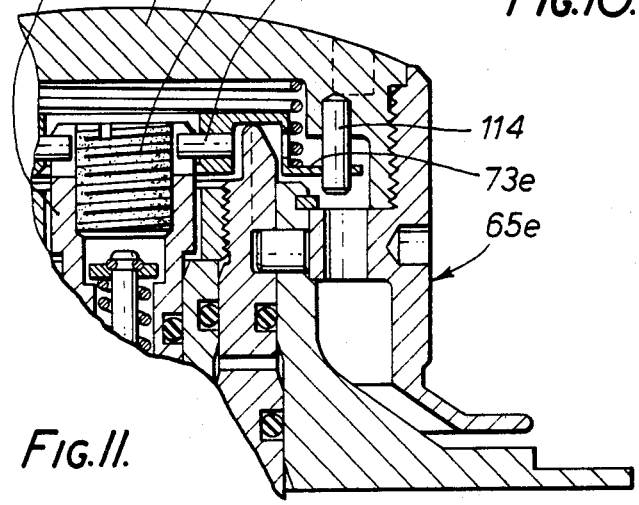
FIG. 11 is a view similar to FIG. 10 showing an alternative silencer, clutch and spring arrangement.

In the construction shown in FIG. 11 the annular silencer is replaced by a cylindrical silencer 82e mounted in the hollow interior of the valve operating member 35e and the dog clutch comprises pins 77e which extend from the disc 73e in radial directions instead of axially as in the previous constructions. The disc 73e is held against rotation relative to the knob 65e by pins 114 carried in the cover 71e.

The construction of spherical pressure vessel and mounting assembly shown in FIGS. 12 to 15 differs from that shown in FIGS. 5 and 6 in two main ways. Firstly, in the location of the venting valve and secondly in the means by which the bottle is retained in the mounting assembly.

The assembly shown in FIGS. 12 to 16 comprises a pressure vessel or bottle 121 having a neck 122 within which there is screwed a generally cup-shaped valve seat member 123 having in its base a central aperture 124 surrounding a seat member 125. Trapped within the seat member 123 by a retaining member 126 is a valve ball 127 which is biased towards the seat 125 by a spring 128.

Figure 12:
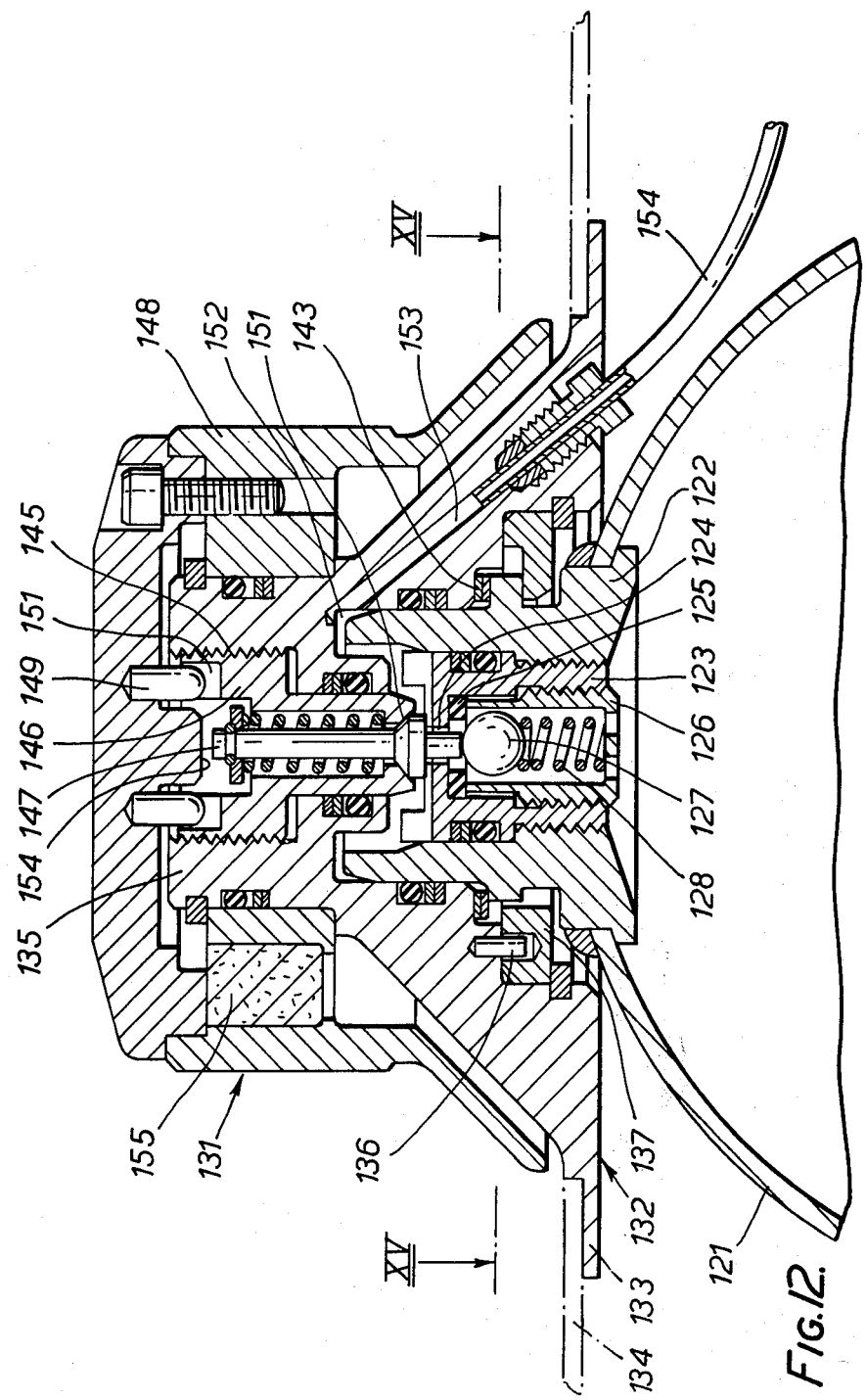
FIG. 12 is an axial section similar to FIG. 6 of a further combination of pressure vessel and mounting showing the neck of the pressure vessel inserted into the mounting.
Figure 14:
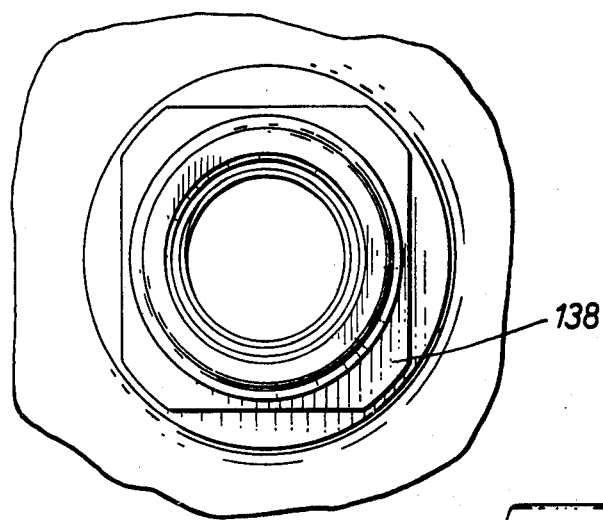
FIG. 14 is a plan view of the pressure vessel shown in FIG. 13.
Figure 13:
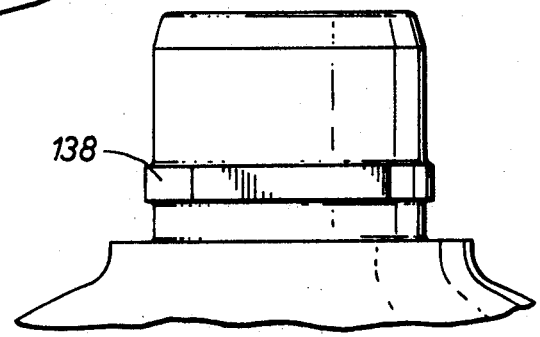
FIG. 13 is a side elevation of the neck of the pressure vessel shown in FIG. 12.
Figure 15:
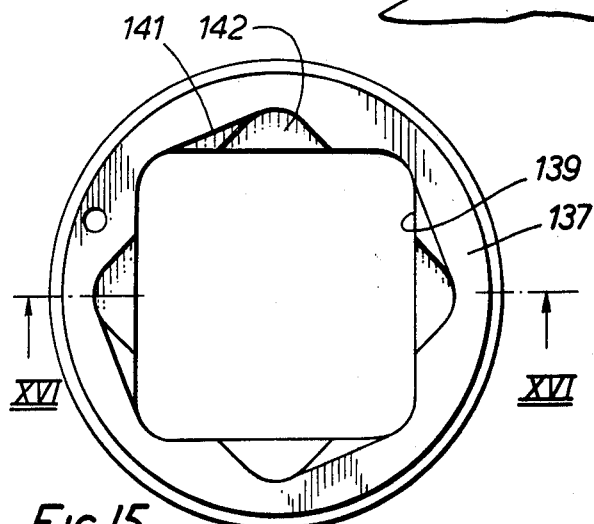
FIG. 15 is a fragmentary plan view on the plane XV—XV of FIG. 12 showing a bayonet plate.
Figure 16:
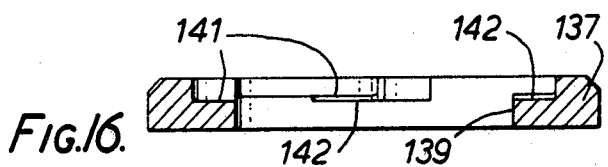
FIG. 16 is an axial section of the bayonet plate shown in FIG. 15 taken on the plane XVI—XVI.

The mounting and valve operating assembly 131 comprises a stationary member 132 having an annular flange portion 133 which is bolted to the mounting wall 134 and a hollow boss portion 135 providing a socket into which the neck 122 of the bottle 121 can be entered. Seated against a rebate 136 on the boss portion 135 is a bayonet plate 137 whose shape can best be seen from FIGS. 15 and 16. This co-operates with a flange 138 on the neck of the bottle, the flange being best seen in FIGS. 13 and 14. The flange has an outline which is square with rounded corners and the bayonet plate 137 has an aperture 139 of corresponding shape. The upper surface of the plate 137 as seen in FIG. 12 is provided with four rebates or shelf portions 141, each of which is generally triangular in shape and extends from one of the corners of the aperture 139 towards one of the adjacent corners. Each of the rebates 141 is provided with a deepened portion 142 having the same shape as one corner of the aperture 139.

The bottle can be inserted into the socket of the mounting assembly by aligning the flange 138 on the bottle with the aperture 139 on the flange plate (in any of four positions) and pushing the neck through the flange plate until a wavy annular disc spring 143 is compressed. The bottle is then rotated through 45° until the corners of the flange 138 are located above the deepened portions 142 of the shelves 141. The spring 143 is then allowed to move the bottle downwardly as seen in FIG. 12 until the corners of the flange 138 rest in the deepened portions 142. In order to remove the bottle, it will be necessary again to move the bottle upwards as viewed in FIG. 12 so that the corners of the flange 138 clear the deepened portions 142.

Screw-threaded within a counterbore 145 in the boss portion 135 of the stationary member 132 is a valve operating member 146 within which is movable a valve member 147, similar to that shown in FIG. 6. A rotatable knob 148 similar to that shown in FIG. 6 is rotatably mounted on the boss portion 135 and rotation of the knob 148 can be transmitted to the valve operating member 146 through a dog clutch formed by pins 149 engaging in castellations 151 in the rim of the valve operating member 146.

The assembly shown in FIGS. 12 to 15 operates as follows. The bottle is first inserted into the mounting assembly in the manner described. The knob 148 is then rotated and this causes rotation of the valve operating member 146 to move the valve member 147 downwardly to move the ball 127 away from the seat 125 to open the discharge valve of the bottle. Gas from the bottle can therefore pass through the seat 125 into the space 152 within the stationary member 132 and thence through a passage 153 and a tube 154 to a point of use. When the bottle is to be changed, the knob 132 is rotated in the opposite direction thus raising the valve operating member 146 to allow the ball 127 to reseat on the valve seat 125. After this has occurred, the upper end of the valve member 147 (as seen in FIG. 12) will engage a surface 154 on the underside of the knob 131 and continued rotation of the knob will cause the seat 151 on the valve operating member 146 to separate from the valve member 147 to open a path from the space 152 through the interior of the valve operating member 146 and a silencer 155 to the exterior.

The bottle can then be removed and a new bottle substituted. On rotation of the knob 131 in the opposite direction, the seat 151 on the valve operating member 146 will initially seat on the valve member 147 to close the passage to the exterior through the silencer 155 and, after this has occurred, the valve member will again unseat the ball 127, to allow gas to pass out of the bottle.

Figure 17:
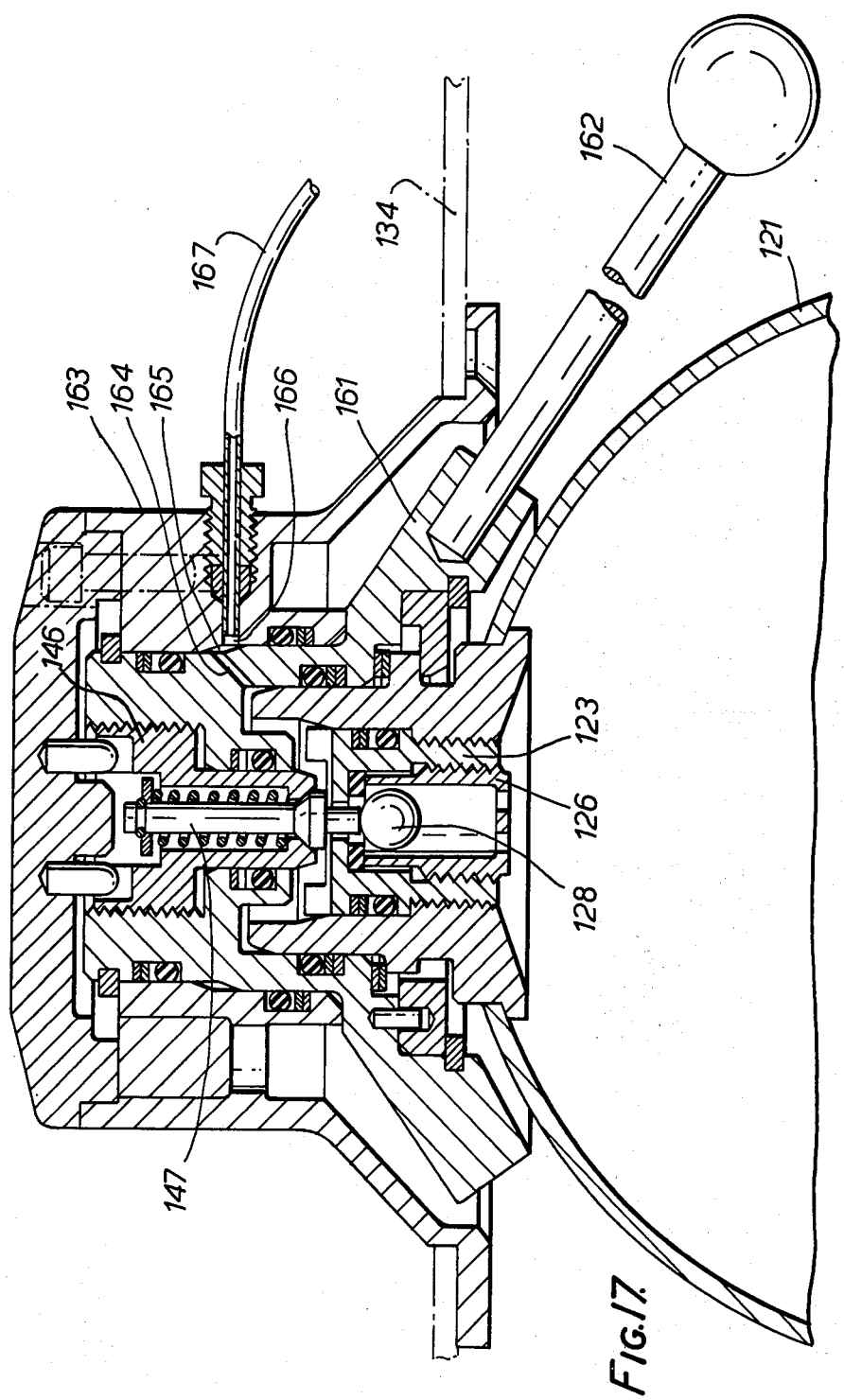
FIG. 17 is an axial section similar to FIGS. 6 and 12 of a further combination of pressure vessel and mounting.

In the construction shown in FIG. 17 the valve arrangement and the method by which the bottle is retained in the mounting assembly are basically similar to the construction shown in FIGS. 12 to 16. However in this case, the knob is stationary and is itself secured to the mounting wall 134 and there is within the knob a rotary member 161 carrying a handle 162. The bottle 121 is mounted in the rotary member so the bottle will rotate with the rotary member. The valve operating member 146 is held stationary by a dog clutch connection with the stationary knob 163 and axial movement of the valve operating member 146 is provided by rotation of the valve operating member 161. To provide a discharge path for the gas from the bottle, the rotary member 161 has a ring of bores 164 leading to an annular space 165 between the rotary member 161 and the knob 163. A passage 166 leads through the knob 163 to the discharge tube 167.

It will be appreciated that in the construction shown in FIG. 17 the valves are controlled from the same side of the mounting wall 134 as the bottle whereas in all the previous constructions, the control is from the opposite side.

What we claim as our invention and desire to secure by Letters Patent is:

1. A valved coupling for high pressure fluids, comprising:
   a first element having a tubular portion with an axial bore therethrough and first coupling means thereon;
   a second tubular element for receiving the tubular portion of the first element and having second coupling means thereon for cooperation with the first coupling means to releasably couple the elements together;
   said elements having passages therein defining a first flow path for fluid through said elements;
   a first valve in the first element for controlling flow through the first flow path;
   a second flow path in the first and second elements extending from a location downstream of the first valve to a vent;
   a second valve for controlling flow through the second path; and
   a valve operating means connected to operate said first and second valves incident to coupling said elements together such that the second valve is first closed and then the first valve is opened, and during uncoupling, the first valve is closed then the second valve is opened, said elements having a bore therethrough and a valve operating member axially movable in the bore under the control of the valve operating means in one direction to open the first valve and in the opposite direction to close the first valve, said second valve comprising a valve member concentric with the valve operating member and axially movable relative to said bore and said valve operating member, a first valve seat on said valve operating member facing generally in said one direction, a second valve seat on said valve member facing in said opposite direction and cooperating with said first valve seat to define said second valve, and stop means engaged by said valve member not earlier than closure of said first valve in movement of said valve member in said opposite direction.

2. A coupling according to claim 1 wherein said valve operating member and said valve member are connected by a spring which biases said valve seats toward one another.

3. A coupling according to claim 1 wherein said valve operating member is mounted to another element by a screw thread whereby relative rotation between said valve operating member and said other element produces axial movement of said valve operating member.

4. A coupling according to claim 3 wherein said other element is fixed in said bore and said valve operating member is coupled to said valve operating means by a coupling transmitting rotation thereto without axial translation thereof.

5. A coupling according to claim 4 wherein said second valve is located in said first element and said first valve is formed by a third annular valve seat on said valve member facing generally in said opposite direction and a fourth annular valve seat on said other element, said third and fourth seats constituting said stop means.

6. A coupling according to claim 1 wherein said first valve is a ball valve comprising a ball and a seat one of which is movable by movement of said valve member in said one direction to open said first valve, and said stop means comprises an abutment on said second element engageable by a surface on said valve member facing in said opposite direction.

7. A coupling according to claim 1 wherein said venting passage contains a silencer.

8. A coupling according to claim 7 wherein said silencer is a porous sintered material.

9. A coupling according to claim 1 wherein said first element comprises the neck of a pressure vessel for pneumatic fluids at pressures above 200 kilograms per square centimeter and said second element comprises a stationary mounting comprising a socket to receive said neck.

10. A coupling according to claim 9 wherein said first flow path extends radially through said neck and radially through said socket.

11. A coupling according to claim 10 wherein the outer surface of said neck is formed with a first cylindrical surface and a second cylindrical surface nearer the free end of the neck and of lesser diameter than said first cylindrical surface, and the inner surface of said socket is provided with corresponding first and second cylindrical surfaces, pressure in said first path operating on the difference in area between said two cylindrical surfaces on the neck to bias said pressure vessel out of said socket, and the releasable connection requiring a movement of said pressure vessel into said socket to permit release of said releasable connection.

* * * * *